Dec. 29, 1964     J. E. HECKETHORN     3,163,411
AUXILIARY SPRING SUSPENSIONS
Filed Aug. 3, 1961     2 Sheets-Sheet 1
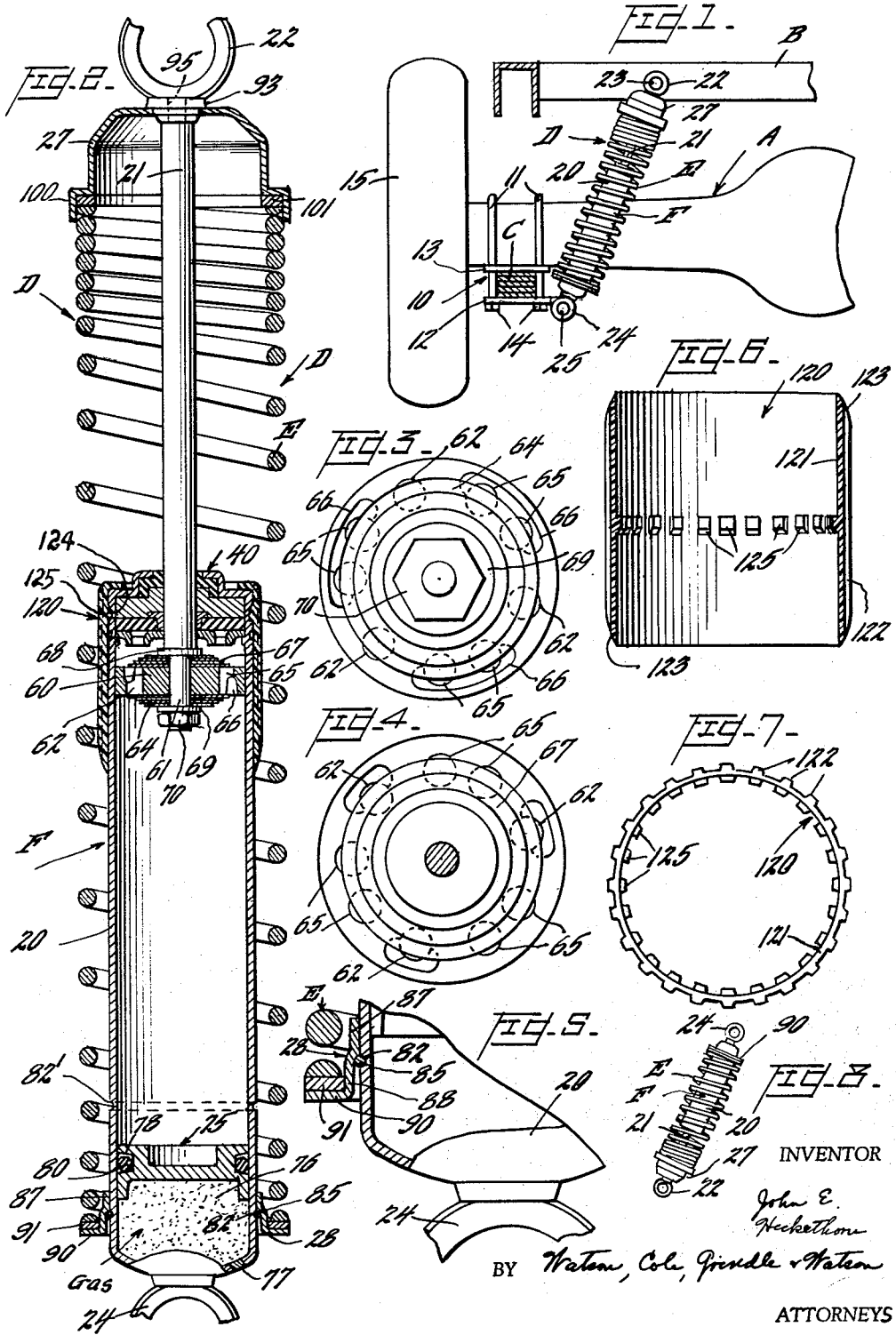
INVENTOR
John E. Heckethorn
BY Watson, Cole, Grindle & Watson
ATTORNEYS Dec. 29, 1964 J. E. HECKETHORN 3,163,411
AUXILIARY SPRING SUSPENSIONS
Filed Aug. 3, 1961 2 Sheets-Sheet 2
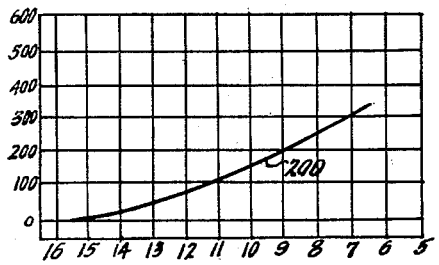
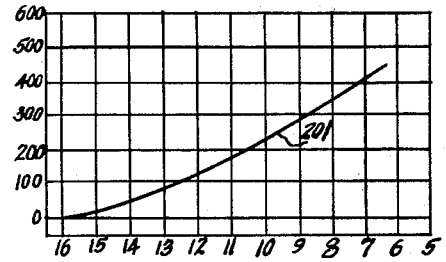
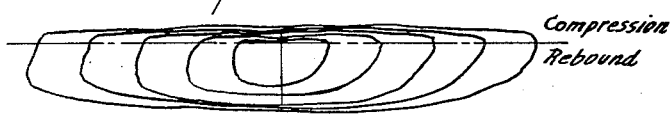
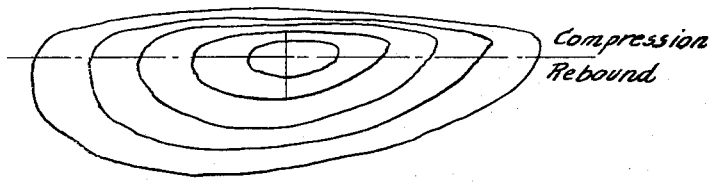
INVENTOR
John E. Heckethorn
BY Watson, Cole, Grindle & Watson
ATTORNEYS United States Patent Office 3,163,411
Patented Dec. 29, 1964

3,163,411
AUXILIARY SPRING SUSPENSIONS
John E. Heckethorn, Dyersburg, Tenn., assignor, by mesne assignments, to Christian Marie Lucien Louis Bourcier de Carbon, Neuilly-sur-Seine, France
Filed Aug. 3, 1961, Ser. No. 129,155
9 Claims. (Cl. 267—8)

This invention relates to spring suspensions for the damped support of a sprung mass from an unsprung mass, as in the case of the chassis and the wheel mounting of a motor vehicle. More particularly, the invention relates to suspensions and sub-divisions thereof which are useful in providing properly damped overload support for motor vehicles, whether passenger cars, station wagons, or other types.

Several kinds of helper-spring and shock absorber combinations have enjoyed some vogue recently for a number of reasons, among which may be cited the rather low road clearance of the chassis and the relatively low spring rates of the suspensions of some current models of automobile, and the increased use of passenger cars and station wagons for carrying heavier loads. However, difficulties have been encountered in reconciling riding comfort and handling under both empty and fully loaded conditions, in eliminating overall harshness of ride due to increase in total spring rate, in the prevention of aeration of the damping liquid in the shock absorber units, in compression lag due to gas pockets in the liquid or other causes, and in many other deleterious factors.

It is therefore the general object of the present invention to provide a novel and improved spring suspension which is designed to obviate such difficulties and to provide numerous advantages in construction and operation, which will be disclosed in more detail as the specification proceeds.

The invention in its preferred embodiments, contemplates the provision of a spring-shock absorber combination readily attachable to all types of motor vehicles, either as original equipment or as accessories or replacements, such supplemental or overload suspension devices comprising telescoping piston and cylinder shock absorbers each surrounded by and supporting a coil spring, the coil spring and the shock absorber acting in parallel with each other and with the main suspension spring of the vehicle, the helper spring, the shock absorber, and the main spring sharing the suspension function as between the chassis or body of the car and the wheel mounting.

Particular novelty and effectiveness lie in the fact that the coil spring used is preferably one of variable spring rate, designed to give minimum additional lift to an empty car but to yield good load carrying characteristics under full load conditions. Whereas the use of a helper spring of a constant forty-pound rate is usual in conventional supplemental suspensions, it is contemplated that for similar situations the spring of the novel combination provided by the present invention shall have a variable rate, say from about thirty to thirty-five pounds when the vehicle is in the at rest position, and increased to from about fifty-five to sixty pounds when the car is fully loaded. The fact that the rate increases as the length decreases permits the use of less total lifting force in the at rest position and still carry a heavy full load. This provides better riding comfort in an empty car and better full-load carrying characteristics.

Another and critical novel factor in the new suspension combination comprises the use of a pressurized hydro-pneumatic shock absorber unit. In these shock absorbers, the usual reservoir and piston rod displacement valving is eliminated and the progressive entrance of the piston rod into the working cylinder upon the compression stroke displaces liquid damping fluid against the pressure of the quantity of gas under pressure with which the shock absorber cylinder is supplied. Thus, the shock absorber element of the suspension device supplies a lifting force and constitutes a third "spring" element in the complete wheel suspension of the car; the main spring, the supplemental coil spring, and the hydro-pneumatic piston rod force of the shock absorber all acting in parallel.

It is well known that any spring has its own spring rate and its own frequency of oscillation. When two springs of different frequencies are working in parallel a damped effect may be obtained. In the present case, three spring devices are used in parallel, all with different frequencies of oscillation. Furthermore, the variable rate coil spring changes in frequency of oscillation constantly as its length is varied. This results in a nulling effect on wheel bounce and body movement which are the result of harmonic oscillation. Thus, there is provided by the present invention three elements of resilient suspension for the vehicle of different types, rates, and frequencies, and the resulting novel combination yields a highly satisfactory completely damped ride.

One feature resulting from the use of the piston rod force of the hydro-pneumatic shock absorber resides in the fact that the piston rod force represents about 40% of the total force in the fully extended position, about 17% of the total force in the at rest position, and only about 13% of the total in the fully loaded position. Thus, the percent of load carried by the rod force factor diminishes as the load increases. One example of this phenomenon would be where the rod force is about forty to forty-five pounds and the spring tension about two hundred twenty-five pounds on a typical installation in the at rest position. When the car is in fully loaded position, the hydro-pneumatic rod force would be about sixty to sixty-five pounds and the spring tension would be about three hundred forty pounds in the same application. In the fully extended position (with the axle vertically hanging from the shock absorbers) the rod force would be about thirty pounds and the spring tension forty-five pounds.

An additional feature of novelty resulting from the provisions of the present invention is the absolutely complete freedom from damping liquid aeration, since the gas pressure contained within the shock absorber cylinder and exerted against the displacement of the damping liquid is substantially greater than any piston in the compression direction which may occur. This assures a tightly compressed column of fluid even during high velocity piston rod movements. The desired gas pressure in the shock absorber unit is always greater than 200 p.s.i. and of course increases as the piston rod progressively enters the cylinder. This accounts for the increase in the piston rod force as the compression of the unit proceeds.

The addition of conventional spring-shock absorber units to motor vehicles produces a higher total spring rate and this higher total spring rate tends to yield a harsher ride, especially if erratic shock absorber action is present. For example, one frequent difficulty is the existence of "compression lag" caused by air pockets in the damping fluid. The impact of the piston moving through such air pockets is quite noticeable in the effect on the ride and some producers have reduced compression control of the shock absorber valving to a minimum so that compression lag will have a less detrimental effect on ride comfort. With the installation afforded by the present invention in which a hydro-pneumatic shock absorber unit is employed, compression lag cannot possibly occur since no gas pockets can be formed in the damping fluid. Thus, it is possible to provide sufficient compression control for stability of the vehicle without sacrificing ride comfort.

Additional features of novelty which have peculiar application to the installation provided by the present invention include the provision of a shock absorber piston provided with progressively operating valving, which piston provides all compression and rebound control. By contrast, most conventional shock absorbers of this general type provide all rebound control but only a certain low percentage of compression control by means of the piston. This is due to the fact that in such devices the piston rod displacement fluid acting on the reservoir or base valving is employed for compression control, the piston itself being equipped with a check valve to permit a substantially free bypass of fluid during the compression stroke.

The use of a hydro-pneumatic shock absorber insures the maintaining of the resistance values over a wide temperature range because of the following factors: (a) the very large piston and valve disc diameters; (b) a damping fluid with a high viscosity index; (c) the progressive opening action of the valving; (d) the extraordinarily large surface area; (e) the single tube construction; and (f) a gas-free damping fluid at all times. These advantages are equally important to the optimum operation of the device in hot weather and cold weather. Also, these features are of greater importance in the case of a spring-shock absorber unit than in an ordinary shock absorber since the total spring rates are higher.

In these installations where an additional helper spring is present, it is especially desirable that "firming up" and "softening" of the shock absorber be reduced to a minimum. When the helper spring is present, it is important to maintain rebound control or the higher-rate springing will result in excessive wheel bounce. Also, when compression control is substantially increased, the ride will become uncomfortable. Therefore, it is just as important to reduce hot weather "softening" as it is to reduce cold weather "firming up" with these helper-spring units.

Other features contributing to the superior operation of the device include the provisions for mounting the shock absorber unit in a variety of positions even inverted with respect to normal or conventional dispositions. Also, a supplemental spring may be employed with a lighter weight and tension than in conventional devices, and the means of attachment of the spring introduces numerous advantages among which may be cited the elimination of the tendency of the spring to become disconnected when the vehicle passes over an extremely rough road.

Additional features include the means provided for protecting the parts from deterioration. The piston rod itself is made of induction-hardened (that is, heat treated) stainless steel. This material is of exceedingly high strength and very resistant to corrosion and furthermore is not subject to flaking as are chrome plated rods. Along with this feature goes the provision of novel means for securing the spring mount to the piston rod.

Further novel purposes of the invention comprise the provision of an improved protective band applied exteriorly to the wall of the cylinder of the shock absorber near the packed end through which the piston rod extends. This band is so shaped and secured to the cylinder as to protect the latter from any possible abrasion by the surrounding coil spring, or contrariwise to prevent similar abrasion of the convolutions of the spring by undesired contact with the cyilnder. The band is preferably made of a new plastic composition which exhibits durability and low friction surface properties. Also, this material has advantageous thermal properties and is preeminently suited for use in this particular combination because of the exceptional cooling characteristics of the hydro-pneumatic shock absorbers themselves. There is also provided a relatively narrow clearance between the band and the spring whereby rattling is minimized.

Abrasion preventing guards of this general character are usually made of rubber, but the surface of a rubber sleeve has a relatively high coefficient of friction which may interfere with the smooth action of the auxiliary spring and it may squeak, tear, or abrade. During operation, the convolutions of the spring are apt to "cling" to the rubber surface and, after a certain amount of added tension, jump free, causing a rough and erratic action. The applicant's novel sleeve, on the other hand, is sufficiently "self-lubricating" to avoid such deleterious action, and it also sheds ice and mud quite well.

Other objects and features of novelty will be apparent from the following specification when read in connection with the accompanying drawings in which one embodiment of the invention is illustrated by way of example.

In the drawings:

FIGURE 1 is a fragmentary diagrammatic view partly in elevation and partly in vertical transverse section of a rear wheel suspension installation for a motor vehicle, embodying the principles of the invention;

FIGURE 2 is a view in vertical diametric cross-section through a spring and shock absorber sub-combination employed in pursuing the invention;

FIGURES 3 and 4 are bottom and top plan views of the piston of the shock absorber portion of the installation;

FIGURE 5 is a fragmentary view in vertical section of a lower portion of the shock absorber cylinder and the supplemental spring, on an enlarged scale;

FIGURE 6 is a view in vertical diametric section of the guide sleeve applied between the shock absorber cylinder and the spring;

FIGURE 7 is an end view of the sleeve;

FIGURE 8 is a diagrammatic view in elevation of the shock absorber and spring attachment adapted for inverted installation;

FIGURES 9 and 10 are spring rate curves illustrative of the variable rate of certain exemplary coil springs, for normal installations and for heavy duty installations respectively;

FIGURE 11 is a pressure diagram of the operation of an original equipment shock absorber for the rear end suspension of a passenger vehicle in the lower or medium price range;

FIGURE 12 is a corresponding pressure diagram of the operation of a shock absorber used in a supplemental suspension device of a known type in current use, for the same car as in FIGURE 11; and FIGURE 13 is a corresponding pressure diagram of the operation of a shock absorber for the supplemental suspension provided by the present invention for use on the same car as in the case of the diagrams of FIGURES 11 and 12.

Referring now more particularly to FIGURE 1 of the drawings, it will be seen that the rear axle installation of an automobile is represented diagrammatically at A and disposed beneath the body of the car, a portion of which is shown at B. The main semi-elliptic leaf spring for the motor vehicle is shown in cross-section at C and is represented as being secured to the axle A adjacent one end thereof by means of the shackle 10 which includes the U-bolts 11 which serve to clamp the plates 12 and 13 about the spring C, the bolts being furnished with nuts 14 for this purpose. The wheel of the car is indicated at 15.

Supplementing the main spring suspension C is the auxiliary shock absorber and spring sub-combination D which comprises the coil spring E which surrounds the reciprocating telescoping direct acting shock absorber F. The cylinder of the shock absorber F is indicated at 20 and the piston rod which issues through a packed opening in the end of the cylinder is shown at 21. The upper end of the rod is formed with an eye 22 which is secured to the frame portion B by means of the bolt or pin 23. The lower end of the cylinder 20 is also provided with an eye 24 which is secured to pin 25 attached to plate 12.

A spring seating bell or cap device is secured adjacent the upper end of the piston rod and is indicated at 27. A lower spring seat is comprised by a ring or annulus indicated generally at 28.

The piston rod, at the upper end of the cylinder 20, passes through an internal pressure-actuated low-friction seal indicated generally by the reference numeral 40.

The piston 60 is fixed to the somewhat attenuated inward end 61 of the piston rod 21 and may be of the same type as disclosed in the co-pending application of De Carbon and Heckethorn Serial No. 67,784, filed November 7, 1960, now United States Patent 3,101,131 of August 20, 1963. The piston is provided with two sets of passageways for the transmission of damping fluid from one side of the piston to the other. One set of passageways comprises the three passageways 62 through which the damping fluid may flow from the upper side of the piston 60, as viewed in FIGURE 2, to the lower side thereof and these passageways are controlled by the set of disc valves 64.

Another set of passageways includes three groups of paired passageways 65 which have a common opening cavity 66 and are controlled by the set of disc valves 67.

The piston and both sets of valves are securely clamped between the inner and outer retainer washers 68 and 69 by means of the nut 70.

The major portion of the cylinder in which the piston 60 reciprocates, is filled with a suitable damping liquid and this volume of liquid is definitely and positively separated by means of the floating piston 75 from a volume of compressed gas 76 occupying the lower end portion of the cylinder 20. This volume of gas is introduced into the cylinder through the plugged opening 77 preferably in accordance with the process disclosed in the co-pending application of John E. Heckethorn Serial No. 17,961, filed March 28, 1960, now United States Patent 3,081,-587 of March 19, 1963. As fully described in the above mentioned Patent 3,101,131 of De Carbon and Heckethorn, the floating piston 75 has a flanged periphery which is provided with an annular groove 78 adapted to receive a resilient O-ring 80 with some marginal clearance to permit rolling or rocking of the O-ring to minimize the sliding action thereof and consequently to reduce wear and also to obtain a quick response to the necessary movement of the floating piston 75.

As clearly shown in FIGURE 5 and in the lower portion of FIGURE 2, the cylinder 20 near its lower end 30 is provided with an annular groove 82 into which may be installed a snap-ring 85. Slipped on the end of this cylinder is the flanged or stepped annulus member 28 having an upper portion 87 which closely surrounds the cylinder, another cylindrical portion 88 which is spaced away from the cylinder only sufficiently to clear the circlip 85, and an outwardly extending flange 90 which forms the lower seat for the coil spring E. A cushioning washer 91 may be inserted between the seat 90 and the lowermost convolution of the spring.

The upper end of the piston rod 21 adjacent the point of attachment of the eye 22 carries the bell-shaped upper spring seat element 27. This element is fitted around the stepped portion 93 of the eye member 22, which portion 93 is internally threaded to receive the threaded end 95 of the heat-treated piston rod 21. The member 27 may be suitably welded to the portion 93 around the periphery of the opening therein.

The lower portion of the member 27 is cupped or flanged to provide the spring seat and guide 100 which also may be provided with a resilient washer 101 against which the upper end of the spring E may seat.

The spring E is installed between the seating arrangements 90 and 100 under a light degree of pre-tension and it will be noted that the interlocking of the lower seating member 28 by means of the snap-ring 85 ensures that the spring will remain at all times in its proper position around the shock absorber even when the vehicle is passing over an extremely rough road, while at the same time permitting ready removal or re-positioning of the ring and the springs when it is desired to do so.

In the spring and shock absorber combination provided by the present invention, the internal diameter of the spring E and the external diameter of the cylinder 20 are not widely different, whereby the clearance between the cylinder and the convolutions of the spring is considerably reduced as compared with prior devices. This reduced clearance minimizes rattling during use, but it is still found to be desirable to provide guiding means for ensuring that the convolutions of the spring as the device is compressed, slide freely past the upper end of the cylinder without snagging or rubbing. For this purpose, there is provided a sleeve 120 which is fitted tightly around the upper portion of the cylinder 20 and preferably interlocked therewith to ensure against displacement. The sleeve is preferably molded as shown most clearly in FIGURES 6 and 7 of the drawings, the cylindrical side walls 121 fitting snugly against the wall of the cylinder and having grooved or slotted exterior surfaces, providing ribs as indicated at 122, to provide escape for dirt. The ribs and wall of the sleeve are preferably curved, bevelled, or tapered off at each end as indicated at 123.

The outer wall surface of the cylinder 20 near its upper end is provided with an annular groove 124 into which the series of inwardly projecting spaced lugs 125, formed on the inner surface of the sleeve 120, may project.

The sleeve is preferably made of a self-lubricating plastic material being a product of E. I. du Pont de Nemours & Company to which the trademark "Delrin" has been applied, and being an injection-molded thermoplastic acetal resin characterized by high tensile strength and rigidity with good dimensional stability, low moisture absorption, high heat-distortion temperature, and exhibiting excellent bearing characteristics and abrasion resistance. This material has a waxy or soapy feel to the touch and exhibits good self-lubricating properties which ensure the substantial frictionless sliding of the spring convolutions over the sleeve without tripping or snagging. The provision of a sleeve made of a material of such properties, together with the radical reduction in clearance, affords good insurance against squeak, rattle, or wear during use. Further more detailed description of the properties of the plastic "Delrin" may be found on pages 118 et seq. of Modern Plastic Encyclopedia, issue for 1963, September 1962, volume 40, No. 1A, published by Modern Plastics, New York, N. Y.

In the application of the sleeve to the end portion of the cylinder the following procedure may be followed. The sleeve is molded with an internal diameter approximately 0.005" smaller than the diameter of the tube or cylinder of the shock absorber. The sleeve is brought to a temperature of about 250° F. and after the shock absorber has been assembled and painted, the sleeve is forced over the rounded end of the shock absorber cylinder and into its final position. At this point the lugs 125 snap into the retaining groove and the sleeve cools to room temperature, gripping the shock absorber body tightly. Then the spring is slipped over the shock absorber and the spring mount 28 and snap-ring 85 installed. In most cases, it is desirable that there be a minimum clearance of 0.020" between the sleeve and the internal diameter of the spring. The tough material chosen for the sleeve can withstand sub-zero temperatures without danger of breakage. The shrink fit, the internal retaining lugs, the ever-present cooling air surrounding the outer surface of the sleeve, and the excellent cooling characteristics of the shock absorber unit chosen combine to prevent possible loosening during high ambient temperature operation.

The supplemental spring E, it will be noted, is of the variable-rate type, the intermediate coils or convolutions of the spring being spaced rather widely apart but becoming progressively closer together at the upper end of the spring and also to a degree at the lower end thereof.

An example of the effect of this variable rate, in one unit under the present invention, the spring has a rate of about thirty-five pounds per inch when the vehicle is empty and in the "at rest" position. This rate increases to about fifty-five pounds per inch when the car is fully loaded. The fact that the rate increases as the length decreases permits the use of less total force in the "at rest" position and still permit the carrying of a heavy full load. This provides better comfort with an empty car and improved full-load carrying characteristics. Although certain supplemental spring devices now in wide use employ springs which weigh three to four pounds each, one spring found to be quite effective in the present installation is considerably lighter, weighing about two and one-half pounds. The use of this lighter spring is made made possible by the improved guiding means and by the supplemental spring support provided by the hydro-pneumatic rod-displacement action. There is less tendency for the lighter spring to thrash around when the car is passing over rough roads because of the lighter spring mass and the improved guiding means. In addition, a smaller wire of which the spring is wound permits a somewhat shorter length and smaller diameter of the spring, both of which are very important for adaptation to existing vehicles with limited clearances and also permits a spring tension adjustment for varying the load-carrying characteristics of the unit.

In FIGURES 9 and 10 of the drawings there are shown typical spring rate charts, the former figure being of a standard installation spring and the latter of a heavy-duty spring. The graph measures pressure corresponding to spring length and from the curve 200 it will be seen that the compression force varies from zero at the full extension of a 15¼" spring, up to about 365 pounds when compressed to approximately 6⅛".

Similarly, in the case of a selected heavy-duty spring the rate extends from zero at the full extension of 16" up to about 475 pounds at 6¼", as shown by the curve 201.

The pressure diagrams of certain installations in a selected motor vehicle are shown in FIGURES 11, 12 and 13 and demonstrate the superior action of the devices constructed in accordance with the present invention. The portions of the curves above the horizontal coordinate record the pressures during the compression stroke of the piston, and the lower portions of the curves indicate the pressures during the rebound stroke, in the well-known manner of testing direct-acting shock absorbers of this type, the several curves in each graph representing tests at five different velocities and amplitudes of piston travel.

In FIGURE 11 which represents an original equipment rear shock absorber pressure diagram for a given car, the largest curve indicates a compression resistance of approximately 160 pounds. FIGURE 12 which is a pressure diagram exhibited by the shock absorber employed in a widely used auxiliary spring combination, shows a maximum compression resistance of approximately 70 pounds, well below that of the original equipment shock absorber for the same car illustrated in FIGURE 11.

The pressure diagram of FIGURE 13 illustrating the action of the present shock absorber, indicates a maximum compression resistance value of approximately 160 pounds; thus the shock absorber portion of the new unit would provide compression control at least equal to that incorporated into original equipment shock absorbers and additional compression control would be provided by the supplemental coil spring and hydro-pneumatic rod-displacement action.

Applicant submits that these resistance diagrams reveal the following comparative advantages in their combination. The practice of reducing compression control when the spring rate is increased is not always advantageous. The substantial compression control normally incorporated into rear shock absorbers is necessary to prevent bottoming when passing over dips, chuck holes, and the like. The practice of eliminating such compression control and substituting what compression control is provided by the helper spring does not compensate for the heavier loads usually carried in vehicles equipped with these units and does not improve the car's resistance to bottoming, but in many cases actually decreases such resistance. Furthermore, since the shock absorber employed in the present suspension combination provides complete freedom from fluid aeration and compression lag, the compression control need not be reduced for the purpose of compensating for these usual problems. On the other hand, the same or greater compression control as in original equipment shock absorbers can be employed in the shock absorber of the present combination without sacrificing riding comfort.

For best effectiveness in the practice of the present invention, the shock absorber element of the novel three-ply spring suspension should be such that the ratio of resistance-to-rebound to resistance-to-compression is approximately 3:1 at 25 inches per second rod velocity.

An important feature of the present invention lies in the adjustability of the lower spring setting as shown in FIGURE 2, by the provision of an additional circumferential groove 82' disposed a predetermined distance above the primary groove 82, for the reception of a snap ring such as ring 85. Because of the relatively smaller wire diameter of the springs used in this suspension, it is possible to provide the spring tension adjustment afforded by the groove 82'. The snap ring 85 may of course be inserted in the upper groove and the spring seating 28 raised accordingly. For most purposes, this supplemental groove may be disposed approximately one inch above the lower groove 82. Vehicles which are driven empty most of the time will not require this additional spring tension and will ride best with the snap ring 85 in the lower groove 82. However, many vehicles are equipped and utilized to carry an extra heavy minimum load at all times. Salesmen and service men frequently carry samples, catalogs, tools, etc. in the trunks of their cars continually and in such cases the provision of the upper adjusted position of the spring seat affords a very useful alternative. Of course, these units may be shipped from the factory with a snap ring installed in the lower groove 82, but the position may be raised to the auxiliary groove 82' very readily.

Other features of the shock absorber portion of the novel suspension which render it well adapted for such installation are the flexible piston valve discs 64 and 67 which exhibit progressive action rather than blow-off action, and the heat treated piston rod which is an exceptionally high strength material, highly corrosion resistant, and not subject to flaking as in the case of chrome plated rods. The extra loading imparted by the spring in the present situation makes the heat treated stainless steel rod a superior material for the shock absorber portion of this unit. As illustrative of such progressive valve disc action, reference is made to my Patents 3,003,596 and 3,088,556 which fully describe the progressive cylindrical flexure of the discs as opposed to the conical flexure prevalent in many other shock absorbers. In the present case the thin valve discs curl or flex approximately in the form of portions of a cylindrical surface.

Then, of course, one quite pronounced advantage is the pressurizing of the shock absorber, which feature inhibits compression lag since a gas pocket cannot ever be formed in the damping liquid. This permits the provision of sufficient compression control for stability of the vehicle without sacrificing riding comfort.

Another advantage of the pressurized shock absorber in this particular connection is that the spring and shock absorber combination can be installed in an "inverted" position (as suggested in the diagram of FIGURE 8 where the shock absorber cylinder 20' is uppermost and the piston rod 21' is downward) or even in a horizontal position for certain specialized applications. The other details of the shock absorber are the same as in the principal figures.

It is understood that various changes and modifications may be made in the embodiment illustrated and described herein without departing from the scope of the invention as defined in the following claims.

Having thus described the invention, what is claimed as new and desired to be secured by Letters Patent is:

1. An augmented overload spring suspension for supporting the body of a motor vehicle from the wheel mounting adjacent each wheel thereof comprising, in combination, a main suspension spring and an auxiliary body supporting spring connected between said body and said wheel mounting; a pressurized shock absorber of the telescoping cylinder and piston type having a cylindrical casing containing a damping liquid and a piston disposed for reciprocation therein, a piston rod having one end fixed to the piston and the other end extended through a packed opening in one end of said casing, means for securing the remote ends of the cylindrical casing and the piston rod respectively to the body and the wheel mounting, a body of gas under pressure in the shock absorber casing exerting pressure on the damping fluid in opposition to the displacement of the latter by the entry of successive portions of the piston rod during the compression stroke; the two springs and the pressurized shock absorber all three acting in parallel to resiliently support the adjacent portion of the weight of the body of the vehicle from the wheel mounting, the spring rates and natural frequencies of the main suspension spring, the auxiliary supporting spring, and the resilient hydro-pneumatic shock absorber suspension member all being of different values, and the spring rates of the auxiliary spring and the shock absorber suspension member varying according to the degree of distortion of said elements under load.

2. The spring suspension as set forth in claim 1 in which both compression resistance control and rebound resistance control and the piston velocities are effected by means of piston valving in the pressurized shock absorber portion of the suspension, and in which a piston and attached flexible disc valving of large diameter are employed in said shock absorber portion of the suspension and said disc valving is of the continuous progressively acting cylindrically flexing type.

3. The spring suspension as set forth in claim 1 in which the resistance-to-compression in the shock absorber portion of the suspension is at least as great as in a shock absorber for use solely for damping purposes in a motor vehicle, and in which the ratio of resistance-to-rebound to resistance-to-compression is approximately 3:1 at 25 inches per second rod velocity.

4. As an article of manufacture, an auxiliary suspension spring and shock absorber combination for application to motor vehicle wheel suspensions or the like, said combination comprising a shock absorber of the telescoping cylinder and piston type having a cylindrical casing containing a damping liquid and having a piston disposed for reciprocation therein, a piston rod having one end fixed to the piston and the other end extended through a packed opening in one end of said casing, means for securing the remote ends of the cylindrical casing and the piston rod respectively to the body and wheel mounting of a vehicle, a quantity of gas under pressure in the shock absorber casing exerting pressure on the damping liquid in opposition to the displacement of the latter by the entry of successive portions of the piston rod during the compression stroke, a coil spring surrounding said shock absorber and adapted to be compressed axially between a seat carried by said shock absorber casing near the remote end thereof and a seat carried by said piston rod near its remote end, the coil spring and shock absorber both exerting a spring-force resisting compression at all times, the seat carried by the shock-absorber casing comprising an annulus resting against a snap-ring removably snapped into a circumferential groove in the outer wall of the casing; and a supplemental groove in said casing wall spaced axially from the first named groove, whereby said snap-ring and consequently said spring-seating annulus may be applied in alternative positions to adjust the minimum spring tension for motor vehicles subjected to continual abnormally heavy loading.

5. As an article of manufacture, an auxiliary suspension spring and shock absorber combination for application to motor vehicle wheel suspensions or the like, said combination comprising a shock absorber of the telescoping cylinder and piston type having a cylindrical casing containing a damping liquid and having a piston disposed for reciprocation therein, a piston rod having one end fixed to the piston and the other end extended through a packed opening in one end of said casing, means for securing the remote ends of the cylindrical casing and the piston rod respectively to the body and wheel mounting of a vehicle, a coil spring surrounding said shock absorber and adapted to be compressed axially between a seat carried by said shock-absorber casing near the remote end thereof, and a seat carried by said piston rod near its remote end, a sleeve carried by and surrounding the cylindrical casing at the inward end portion thereof through which said piston rod extends, the outer surface of said sleeve having but slight clearance with the inner portions of the convolutions of said spring, said sleeve being made of an injection molded thermo-plastic resin characterized by high tensile strength and rigidity, good dimensional stability, low moisture absorption, high heat-distortion temperature, having a low friction coefficient and exhibiting good bearing characteristics and abrasion resistance and thus possessing self-lubricating properties ensuring the substantial frictionless sliding of the spring convolutions over said sleeve without tripping or snagging.

6. The article as set forth in claim 5 in which the outer surface of the sleeve is provided with longitudinally extending alternating ribs and grooves, and is chamfered at both ends thereof.

7. A shock absorber of the direct-acting telescoping piston-and-cylinder type adapted to be fitted within the convolutions of a coil spring to provide a shock absorber-spring combination for the wheel suspensions of automotive vehicles or the like, said shock absorber comprising a cylindrical casing containing a damping fluid, and a piston disposed for reciprocating movement therein, a piston rod being secured at one end to said piston and extending through a packed opening in an end of said casing, means for securing the remote ends of the casing and piston to one or the other of the parts the relative movement of which is to be damped, a low-friction plastic-like sleeve surrounding the cylindrical wall of said casing at the end thereof through which said piston rod extends, a circumferential groove in the wall of said casing, and an internal peripheral rib portion formed on said sleeve and interlocked with said groove.

8. The shock absorber as set forth in claim 7 in which said rib portion is interrupted to form an annular series of inwardly projecting lugs entering the groove.

9. The shock absorber as set forth in claim 7 in which said sleeve is in a state of tension upon the casing as the result of having been shrunk onto said casing to fix it firmly thereto.

References Cited by the Examiner

UNITED STATES PATENTS 1,998,356   4/35   Brown.
2,387,264   10/45   Holland _____ 267—61

(Other references on following page)

UNITED STATES PATENTS

| | | | |
|---|---|---|---|
| 2,576,935 | 12/51 | Hayes | 267—18 X |
| 2,756,045 | 7/56 | Savory | 267—8 |
| 2,774,446 | 12/56 | Bourcier de Carbon | 267—64 X |
| 2,774,993 | 12/56 | Hagen et al. | |
| 2,823,915 | 2/58 | Bourcier de Carbon | 267—8 |
| 2,874,955 | 2/59 | McIntyre et al. | 267—8 |
| 2,896,938 | 7/59 | Walker | 267—8 |
| 2,902,274 | 9/59 | McIntyre | 267—8 |
| 2,925,263 | 2/60 | Blythe | 267—8 |
| 2,980,418 | 4/61 | Doetsch | 267—34 |

FOREIGN PATENTS

| | | |
|---|---|---|
| 811,556 | 4/59 | Great Britain. |
| 852,503 | 10/60 | Great Britain. |

ARTHUR L. LA POINT, *Primary Examiner.*

RICHARD A. DOUGLAS, ROBERT C. RIORDIN,
*Examiners.*